INVENTOR.
Merrill G. Beck
BY Ralph Hammar
Attorney 3,269,717
RESILIENT MOUNTING
Merrill G. Beck, Erie, Pa., assignor to Lord Manufacturing Company, Erie, Pa., a corporation of Pennsylvania
Filed July 20, 1964, Ser. No. 383,583
6 Claims. (Cl. 267—1)

This invention is a resilient mounting having a central core with offset tangentially arranged spokes which induce rotation of the core under load and thereby obtain an extended deflection at light loads.

Figure 1:
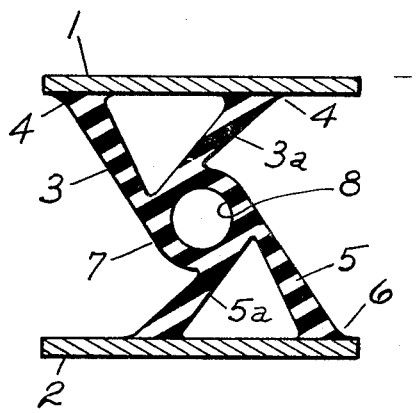
Figure 2:
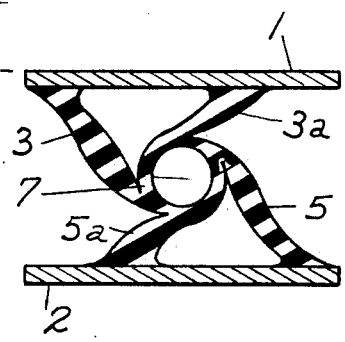

In the drawing, FIG. 1 is a sectional elevation of the mounting under no load, and FIG. 2 is a sectional elevation under load.

In the drawing, 1 and 2 indicate supporting and supported members of suitable structural material suitably shaped to fit the article to be supported and the supporting structure.

In load carrying relation between the members 1 and 2 is a body of elastomeric material having a plurality of spokes 3, 3a with upper ends 4 bonded to the member 1 and a plurality of spokes 5, 5a with ends 6 bonded to the member 2. The spokes 3, 3a are generally on one side of a core 7 and the spokes 5, 5a are generally on the opposite side of the core 7. The core may have a central opening 8 if desired.

Under load, the spokes 3, 5 which are more nearly vertical in the unloaded position are primarily in compression for the first increment of deflection. Under increasing load, the spokes 3, 5 are forced to bend and become softer as the mounting is deflected further. As the load increases, the compression of spokes 3, 5 decreases and the bending increases. This reduces the build up of spring rate or stiffness which would be present if the spokes were loaded exclusively in compression. At small deflections, the spring rate may even decrease. The reason for the bending is that the cross section of the spokes 3, 5 is small compared to the length. A further reason for the bending is that the rotation of the core 7 under load causes further offsetting of the ends of the spoke connected to the body 7 and thereby increases the tendency of the spokes to bend. The spokes 3a, 5a are initially deflected primarily in bending and do not offer great resistance to rotation of the core 7 but as the deflection becomes greater, the spokes 3a and 5a shorten by the amount they overlap the core and cause the mounting to stiffen. The spokes 3a and 5a are also stabilizers for the core 7.

The load deflection curve starts at a relatively gradual slope which may even decrease slightly at light loads. Under heavy or overloads, the mounting stiffens and the slope of the load deflection curve increases. The stiffening of the mounting under heavy loads can be controlled by the position and size of struts 3a and 5a and by the diameter of the core 7. The stiffening is made more abrupt by increasing the diameter of the core and less abrupt with a hollow core such as indicated at 8.

What is claimed as new is:

1. A mounting comprising supporting and supported members arranged one above the other, a body of elastomer having a core between said members, a pair of generally vertical struts of elastomer extending respectively upward and downward from the core and with adjacent ends of the struts laterally offset from each other and integral with opposite sides of the core and with remote ends united respectively to one and the other of said members.

2. A mounting comprising supporting and supported members arranged one above the other, a body of elastomer having a core between said members, a pair of generally vertical struts of elastomer extending respectively upward and downward from the core and with adjacent ends of the struts laterally offset from each other and integral with opposite sides of the core and with remote ends united respectively to one and the other of said members, another strut of elastomer associated with each of the vertical struts, adjacent ends of the other struts being respectively integral with upper and lower sides of the core and remote ends of the other struts being united respectively to one and the other of said members, said other struts extending tangentially in the same direction about the axis of the core.

3. A mounting comprising supporting and supported members arranged one above the other, a body of elastomer having a core between said members, a pair of generally vertical struts of elastomer extending respectively upward and downward from the core and with adjacent ends of the struts laterally offset from each other and integral with opposite sides of the core and with remote ends united respectively to one and the other of said members, the length to cross section ratio of the struts being such that the struts bend under load and wind around the core as the core turns under load.

4. A mounting comprising supporting and supported members arranged one above the other, a body of elastomer having a core between said members, a generally vertical strut extending respectively upward and downward from the core and with adjacent ends of the strut laterally offset from each other and integral with opposite sides of the core and with remote ends united respectively to one and the other of said members, the length to cross section ratio of the struts being such that the struts bend under load and wind around the core as the core turns under load, another flexible strut of elastomer associated with each of the vertical struts, adjacent ends of the other struts being respectively integral with upper and lower sides of the core and remote ends of the other struts being united respectively to one and the other of said members, said other struts extending tangentially in the same direction about the axis of the core and resisting rotation of the core by effective length of struts shortening as it overlaps the core.

5. A mounting comprising supporting and supported members arranged one about the other, a body of elastomer having a hollow core between said members, a pair of generally vertical struts of elastomer extending respectively upward and downward from the core and with adjacent ends of the struts laterally offset from each other and integral with opposite sides of the core and with remote ends united respectively to one and the other of said members, the length to cross section ratio of the struts being such that the struts bend under load and wind around the core as the core turns under load.

6. A mounting comprising supporting and supported members arranged one above the other, a body of elastomer having a core between said members, a generally vertical strut extending respectively upward and downward from the core and with adjacent ends of the strut laterally offset from each other and integral with opposite sides of the core and with remote ends united respectively to one and the other of said members, the struts being primarily in compression for the first increment of deflection and the length to cross section ratio of the struts being such that the struts bend under load and wind around the core as the core turns under load, another flexible strut of elastomer associated with each of the vertical struts, adjacent ends of the other struts being respectively integral with upper and lower sides of the core and remote ends of the other struts being united respectively to one and the other of said members, said other struts extending tangentially in the same direction about the axis of the core and resisting rotation of the core by effective length of struts shortening as it overlaps the core.

References Cited by the Examiner
UNITED STATES PATENTS 2,447,712　8/1948　Nathan _____ 248—22
2,917,264　12/1959　Hartenstein _____ 248—358
3,103,348　9/1963　Paulsen _____ 267—1

ARTHUR L. LA POINT, *Primary Examiner.*

R. M. WOHLFARTH, *Assistant Examiner.*